United States Patent [19]

Deibel

[11] Patent Number: 5,412,706
[45] Date of Patent: May 2, 1995

[54] MAMMOGRAM MARKING SYSTEM

[76] Inventor: David L. Deibel, 3 Anchorage Cir., Groton, Conn. 06340

[21] Appl. No.: 107,916

[22] Filed: Aug. 17, 1993

[51] Int. Cl.⁶ .............................................. G03B 42/02
[52] U.S. Cl. ..................................... 378/162; 378/165
[58] Field of Search ................. 378/162, 163, 164, 165

[56] References Cited

U.S. PATENT DOCUMENTS 4,953,193  8/1990  Robinson ............................. 378/162
5,297,188  3/1994  Fajae et al. ....................... 378/165 X Primary Examiner—David P. Porta

[57] ABSTRACT

This invention is directed to a marking system for taking X-ray films. The marking system comprises an X-ray transparent letter holding means configured to hold one or more X-ray opaque letters and/or indicia, said holding means having one or more fastening members that permit it to be removably attached to an X-ray film holder, and cooperating fastening members on the X-ray film holder.

1 Claim, 1 Drawing Sheet

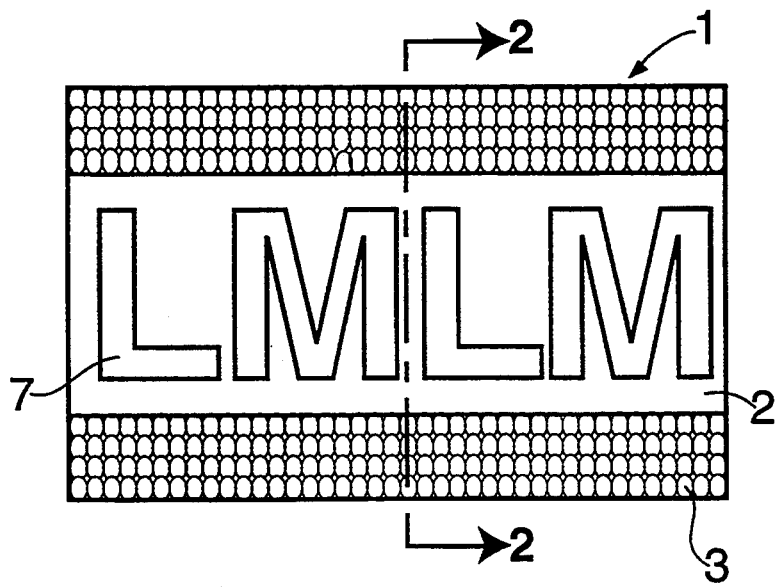
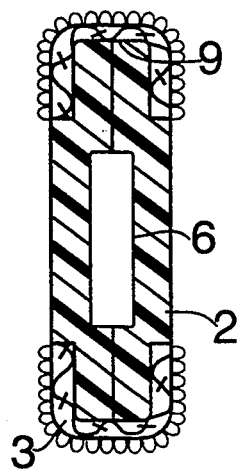
FIG. 1  FIG. 2
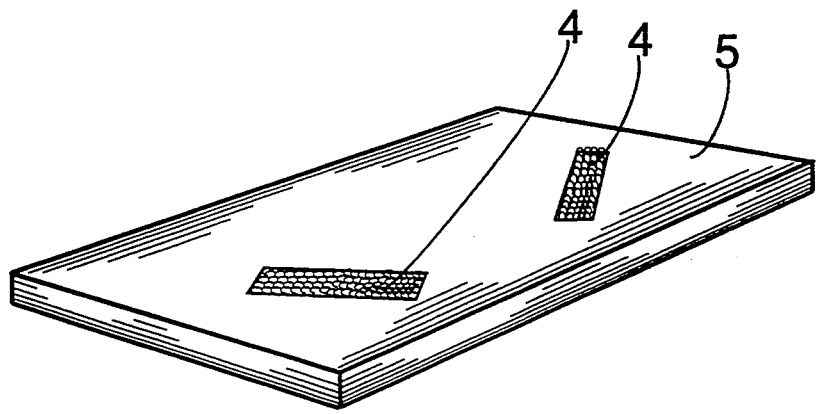
FIG. 3
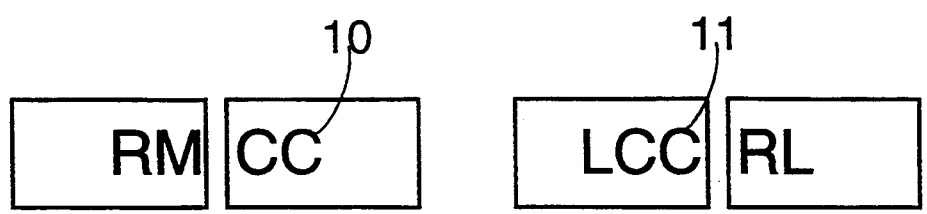
FIG. 4  FIG. 5

MAMMOGRAM MARKING SYSTEM

FIELD OF THE INVENTION

The invention relates generally to X-ray machinery and is specifically directed to dedicated mammography units which are used both for screening mammography and diagnostic mammography.

BACKGROUND OF THE INVENTION

The importance of proper marking (labeling) of mammograms can not be overstated. To properly interpret a mammogram, the radiologist must be aware of the precise view under study, which is difficult due to the similarity in appearance of views such as medio-lateral oblique and craniocaudal views, and other diagnostic views of breast tissue. Thus, a clear, concise identification (mark) must exist on the X-ray film to resolve ambiguity.

Lead letters are the generally accepted method of marking or identifying the mammogram on X-ray film by preventing X-ray energy from exposing the film directly underneath the letters. When the film is developed, the letters will stand out as white against a dark background. The exact sequence of letters which identify the various mammographic views are specified by the American College of Radiology.

To assist the radiologist who is interpreting (reading) the mammographic film, the letters identifying the view should be located in a specific location on each film. This permits the radiologist to spend more time studying the breast tissue under consideration and to thus be more productive.

Marking systems currently in use either can not be reversed or they can not be readily identified when in position since their letters are obscured by the mounting means utilized. For example, with a normal X-ray exposure of the film the identification code for a medio-lateral oblique projection view will be read as "RMLO" when the film is viewed emulsion side DOWN on the view box. However, if the radiologist wants to examine the film with the emulsion side UP, the label code would read "OLMR", causing distraction and possibly misinterpretation. When the marker can be applied to the bucky in the reversed position, then an emulsion side UP would be "right reading" and the emulsion side DOWN would be "wrong reading." Most of the current marking systems can not be easily reversed to provide "right reading," and those that can be reversed, for example, those that are taped onto the bucky, can not be readily identified by the X-ray technologist as to the view and/or whether the letters are upside down or not, prior to the exposure of the film.

The systems of attaching markers using glue, tape, or suction cups are troublesome. These methods are deficient in that they do not permit consistent, repeatable location of the markers or easy identification of the view in question, and the markers are sometimes difficult to apply.

OBJECTS OF THE INVENTION

It is an object of this invention to provide an easy to use, highly repeatable, accurate and durable system for "marking", i.e., labeling, mammograms to correspond to the American College of Radiology (ACR) recommendations and specifications.

It is also an object of this invention is to provide a mechanism which assures completely repeatable location of X-ray film markings.

It is another object of this invention is to simplify the problem of marking X-ray films so that they may be viewed on a viewing box or other viewing device, either "Emulsion Side Up" or "Emulsion Side Down" and have the "marking" on the film be "right reading" at all times.

These objects and other objects and advantages of this invention will become more apparent from the description below.

BRIEF DESCRIPTION OF THE DRAWINGS

FIG. 1 is a frontal view of an embodiment of the invention comprising a complete marker which contains one of a variety of specific marking codes;

FIG. 2 is a cross-sectional view of a complete marker taken along the line A—A of FIG. 1;

FIG. 3 is a perspective view of an X-ray bucky with hook material such as VELCRO ® fastening material mounted in the appropriate location for mammograms; and FIGS. 4 and 5 are each a frontal view of a marker according to the invention demonstrating how various markers are combined to generate the requisite codes for mammographic marking.

DETAILED DESCRIPTION OF THE INVENTION

The present invention concerns a system for marking mammograms which system comprises a marker means removably attached to the shell, or bucky, that holds X-ray film. The marker means comprises an X-ray transparent member having on one or more edges fastener means that removably attach to corresponding fastening means on the bucky. The transparent member contains X-ray opaque letters or other indicia. The marker means is positioned by pressing one of the fastening means of the marker means against corresponding fastening means on the bucky.

The invention can perhaps be better appreciated by making reference to the drawings. As shown in FIG. 1, marker means (1) comprises an X-ray transparent member (2) having one or more fastener means (3), such as the oppositely positioned fastener means (3) shown here. In a preferred embodiment of the invention, fastener means (3) comprises VELCRO loop material that is secured to at least one edge (9) of transparent member (2). Fastener means (3) can be removably attached to a corresponding fastener means such as adhesive-backed VELCRO hook material (4) shown in FIG. 3. Fastener (4) is attached to a portion of the bucky (5) that holds X-ray film (not shown).

X-ray transparent member (2) comprises an opening (6) in which X-ray opaque letters (7) have been inserted. Each letter (7) is used by itself or it may be encased in an X-ray transparent material that is dimensioned to fit within opening (6).

The X-ray transparent member (2) of the marker (1) can be manufactured from any optically and radiographically clear material which is dimensionally stable. A preferred material is a polymeric material such as LEXAN ® polymer, available from General Electric, or a similarly rigid, radiotransparent polymer, such as plexiglass. The fastening members (3,4) should be positioned so that there is no interference with the reading of the letters (7) from either side of the marker (1). It is within the scope of the invention that there may be only one fastener member (3) or a series of fastener members (3) distributed around the periphery of the X-ray transparent member (1). However, the arrangement shown in FIGS. 1 and 2 is preferred.

In the manufacturing process the letters (7) are inserted into the opening (6) between separate "halves" of transparent member (2), which halves have been prepared by molding or milling. Then, the halves are bonded together at surface (8) by mechanical means, such as ultrasound or heat, with an adhesive, such as an epoxy, or with a solvent, such as acetone, whereby letters (7) are securely positioned. Next the fastener means (3) is applied around the desired edges (9).

The specific manner in which the fastener means (3) are mounted on the transparent member (2) is important since the desired arrangement should permit omnidirectional mounting on the X-ray bucky (5) while allowing unhampered reading of the letters (7). Preferably fastener material is attached to one side of the marker (1) and is wrapped completely around a longitudinal edge of the transparent member (2), continuing to the other side. This is preferably done at the two oppositely-positioned, parallel surfaces of the transparent member (2) to insure that there is always fastener material located in position to be secured by fastener material (4) mounted on the X-ray bucky (5) or on a separate marker storage rack (not shown).

In FIG. 3 it can be seen how the specific location of the marker (1) on the bucky (5) can be determined accurately. Sections or strips of fastener material (4) are mounted directly on the X-ray bucky (5) in the positions indicated which conform to American College of Radiology recommendations. Preferably loop material of fasteners (3) are engaged by VELCRO hook material (4) on the bucky (5) and thus the marker means (1) is secured to the bucky (5) for the film exposure sequence. A gentle tug will release the marker (1) from the fasteners (4) and permit another marker to be placed in position as required. When the marker (1) is secured to the bucky (5) in the desired manner, the code letters (7) in the marker (1) are readily viewed. Should the marker (1) be reversed to provide "right-reading" for the radiologist who wants to read the film emulsion-side up, it will still be possible to completely identify the marker since it is transparent.

In FIGS. 4 and 5 it can be seen how the markers useful according to the invention can be combined to comply with different marking requirements. The letters (10) shown in FIG. 4 identify the view as the right magnification cranial caudal image, whereas the letters (11) in FIG. 5 identify the view as a left cranial caudal rolled lateral view.

It is important to note that the X-ray transparent holder (2) of letters (7) and the respective locations of the fastener material (3,4) permit the arrangement of the letters to be in full view at all times. It is thus possible to determine orientation of the letters before the X-ray exposure is made. The ability to determine the correct orientation of the letters before the exposure eliminates repeat exposures to correct an improper marking.

The preceding specific embodiments are illustrative of the practice of the invention. It is to be understood, however, that other expedients known to those skilled in the art or disclosed herein, may be employed without departing from the spirit of the invention or the scope of the appended claims.

I claim:

1. A marking system for taking X-ray mammography films comprising an X-ray transparent letter holding means configured to hold one or more X-ray opaque letters and/or indicia, said holding means having one or more fastening members that permit it to be removably attached to an X-ray film holder, and the X-ray film holder having cooperating fastening members, wherein the fastening members comprise hook and loop fastener loop material at oppositely positioned edges of the letter holding means and hook and loop fastener hook material at one or more places on the X-ray film holder.

* * * * *